March 22, 1932. E. A. SPERRY ET AL 1,850,780
SELF SYNCHRONOUS TRANSMISSION SYSTEM
Filed April 12, 1928 2 Sheets-Sheet 1
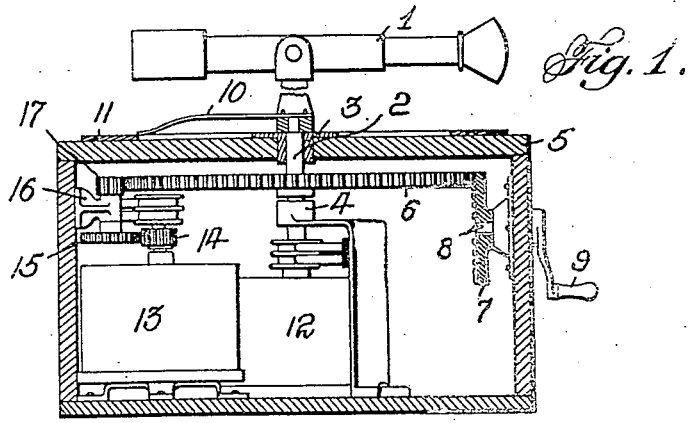
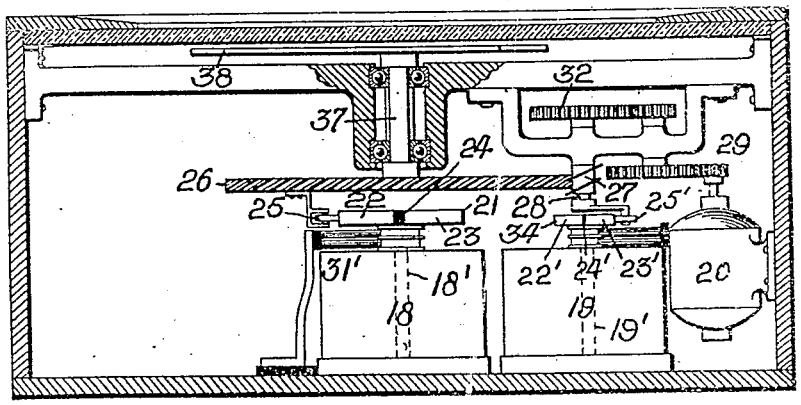
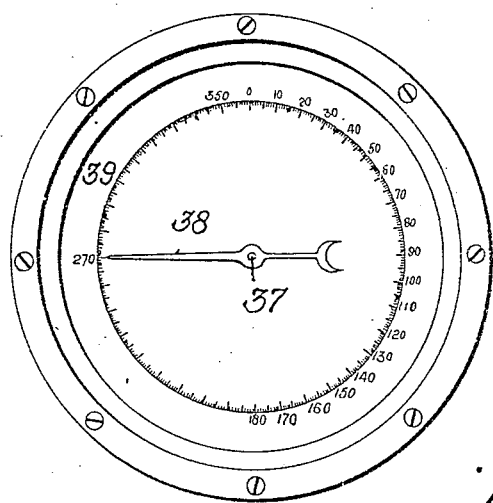
INVENTORS:
ELMER A. SPERRY
ELMER A. SPERRY, JR.
BY
Herbert H. Thompson
their ATTORNEY.

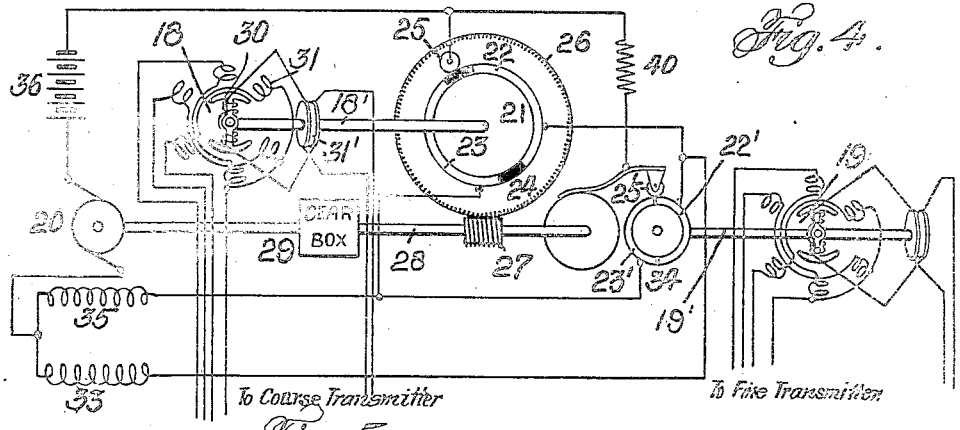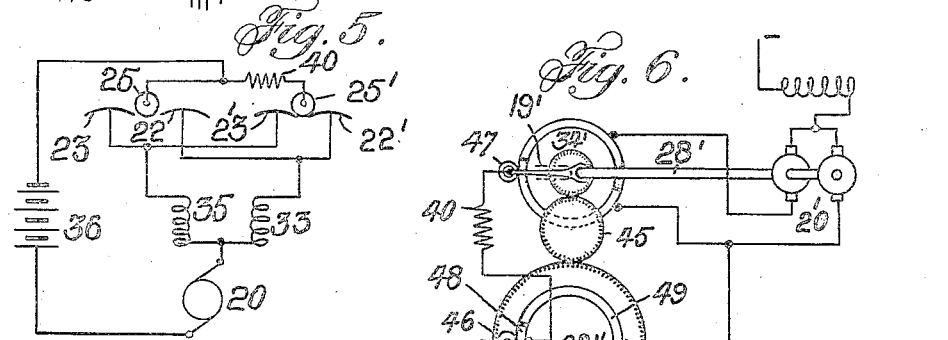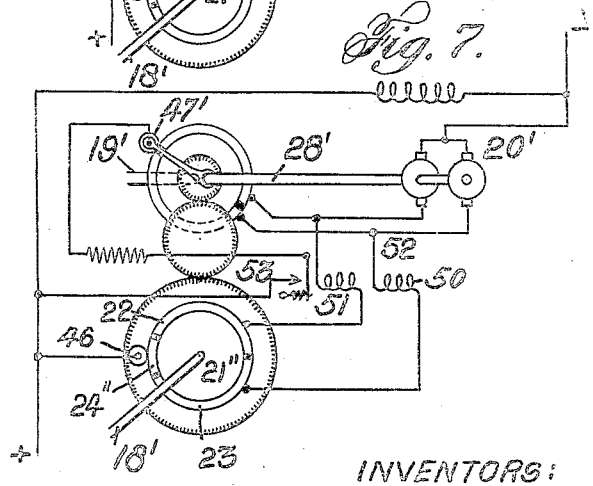

Patented Mar. 22, 1932

1,850,780

UNITED STATES PATENT OFFICE

ELMER A. SPERRY AND ELMER A. SPERRY, JR., OF BROOKLYN, NEW YORK, ASSIGNORS, BY MESNE ASSIGNMENTS, TO SPERRY GYROSCOPE COMPANY, INC., OF BROOKLYN, NEW YORK, A CORPORATION OF NEW YORK

SELF-SYNCHRONOUS TRANSMISSION SYSTEM

Application filed April 12, 1928. Serial No. 269,347.

This invention relates to the reproduction at a distance of the angular motion of an object, such as a sight, a gyroscopic compass, or other rotatable instrument. More especially it relates to transmission systems of the self-synchronous type wherein the exact angular movements of the sending instruments are reproduced at the receiver and in which the receiver may be of a type requiring appreciable torque to actuate. In the A. C. self-synchronous transmission systems which have come into use, it is usual to have at the receiving instrument a plurality of dials driven at multiple speeds and actuated respectively from coarse and fine transmitters. Such a system, however, is not adapted for use where it is necessary to reproduce the angular movements of the sending instrument itself rather than merely to give a numerical indication of its movements. The advantages of self-synchronism may be lost if the angular movements are reproduced accurately by gearing down the repeater motors to the indicator, and in addition it is found that the A. C. type of repeater motors is not adapted to drive any gearing since all load must be removed from the motor if accurate results are to be obtained. More particularly this invention comprises an improvement in the self-synchronous transmission system shown and claimed in the prior patent to Elemer Meitner No. 1,509,248, dated September 23, 1924 and assigned to the assignee of the present application. The present application contains matter divided from our parent application, Serial No. 372,809, for self-synchronous transmission systems, filed April 10, 1920, this application being to that extent a continuation of our said prior application.

Referring to the drawings in which several of the preferred forms of the invention are shown, Fig. 1 is a side elevation, partly in section, of one form of transmitting instrument.

Fig. 2 is a side elevation of a receiving or repeating instrument with the casing thereof shown in section.

Fig. 3 is a plan view of the receiving instrument of Fig. 2.

Fig. 4 is a diagrammatic view showing some of the wiring of the receiving instrument.

Fig. 5 is a simplified diagram showing the wiring connections only of the reversible power motor.

Fig. 6 is a wiring diagram of a modified form of connections for our invention.

Fig. 7 is a wiring diagram of a further modification.

While our transmission system may be used to indicate the angular position of any remotely located object, such for example as a compass card or other indicator, we have shown it in connection with a sighting instrument, for indicating the bearing of a target. In Fig. 1 the sighting instrument 1 is shown carried by a shaft 2, the latter being journaled in bearings 3, 4, in a casing 5. Shaft 2 may be rotated in any suitable way as by means of a gear wheel 6 fixed on said shaft and meshing with a crown gear 7 on a shaft 8 mounted in casing 5. Shaft 8 may be actuated by means of a crank handle 9 or in any other suitable manner. If desired, an indicator 10 may be mounted to turn with shaft 2 and may cooperate with a scale 11 carried by casing 5 as shown.

For transmitting the angular positions of instrument 1 and pointer 10, we have shown a coarse transmitter 12 connected directly with shaft 2 and a fine transmitter 13 connected with said shaft through multiplying gearing. Thus, the shaft of transmitter 13 is shown carrying a gear 14 which meshes with a gear 15 carried by a shaft rotatable in bracket 16 in casing 5, which shaft also carries a gear 17 meshing with the gear wheel 6 on shaft 2. Obviously various types of connections may be made between shaft 2 and transmitter 13, and the connection shown is merely illustrative. The connection aforesaid may, of course, be designed to give any suitable number of revolutions of the shaft of transmitter 13 to one revolution of shaft 2. For purposes of illustration, we have assumed that gearing suitable for obtaining 72 revolutions of the shaft of transmitter 13 to one of shaft 2, or, in other words, one revolution of said transmitter shaft to rotation of shaft 2 through five degrees, has been provided.

At the receiving station we have shown two repeater motors 18 and 19, the former or coarse motor being connected with transmitter 12, and the latter, or fine motor, with transmitter 13. The transmitters and repeaters we have shown are of a general type known in the art wherein each comprises a single phase rotor 30 and a three phase stator 31 (Fig. 4), slip rings 31' supplying current to the former. In order to relieve both motors of any gearing or other load, we prefer that neither motor be directly connected to the indicator or other driven element. As shown, both the fine and coarse motors are provided with contacts designed to bring into operation a power motor 20 for turning the indicator. As shown, the shaft 18' of the one-to-one motor 18 is provided with a disc 21 having conducting segments 22 and 23 separated by fairly broad insulating portions 24 (Fig. 4). Cooperating with disc 21 is a trolley or other brush 25 carried by the rotatable element. The latter element is shown in the form of a worm wheel 26 with the teeth of which meshes a worm 27 on a shaft 28. Shaft 28 may, if desired, be driven directly from the power motor 20, or any desired gear reduction 29 may be interposed between shaft 28 and the motor pinion 32. Movable with shaft 28 is a second trolley or brush 25' adapted to cooperate with a disc 34 driven by shaft 19' of motor 19. The latter disc is provided with contact segments 22' and 23' separated by narrow portions of insulating material 24'. Motor 20 is shown provided with oppositely wound fields 33 and 35, the former of which is connected with contacts 22 and 22', while the latter is connected with the other contacts 23 and 23'. Motor 20 may be connected as shown with a source 36 of E. M. F., said source being connected also with trolleys 25 and 25'. Preferably a resistance 40 is placed in series with trolley 25' to weaken the current supplied thereby as compared to that supplied through trolley 25. The shaft 37 of worm wheel 26 may carry an indicator 38 or other object which may cooperate a reference scale or device 39. Of course, while we have shown a worm drive between shaft 28 and the indicator, it will be evident that other forms of gears or other connections may be utilized.

The connections between motor 20 and the trolleys and cooperating contact discs are so arranged that, when a contact segment is brought into engagement with its cooperating trolley, the motor is energized to move the trolley back into engagement with the insulating portion of the disc, so that the trolley and associated parts follow the movements of the contact disc and associated repeater. The insulating portions 24 of disc 21 are shown sufficiently large so that said disc may move to a certain extent with respect to trolley 25, within the limits of accuracy of repeater motor 18 and transmitter 12, without bringing a contact portion of the disc into engagement with the trolley. The gear ratio between shafts 37 and 28 should be the same as that between the transmitter 12 and 13, so that both trolleys 25 and 25' will be caused to follow up accurately the movements of respective disc 21 and 34. The ratio of gearing between follow-up gear and the trolleys 25 and 25' is such that trolley 25' can never make more than one half a revolution without trolley 25 engaging one of the segments 22 or 23 to return trolley 25 to the insulated portion. In other words the size of the insulated portion is such that trolley 25 will engage one of the contact segments 22 or 23 before trolley 25' has made one half a revolution, the latter operating thereafter to operate motor 20 to restore said trolley to its insulated portion. The closing of the circuit by contacts 22, 23 and 24 thus sets in operation a follow-up mechanism which remains effective until the circuit is again broken. Similarly, the follow-up mechanism is actuated when contacts 22', 23' and 24' close the circuit.

The operation of the form of invention above described will now be readily understood. If sighting instrument 1 be turned through a very small angle, i. e. less than the limit of accuracy of transmitter 12 and repeater 18, the latter may not cause the energization of motor 20. However, the corresponding contact segment of disc 34 driven by the fine repeater 19 will come immediately into contact with trolley 25', and motor 20 will be energized to turn shaft 28 and gear 26 through the correct angle. If, now, sighting instrument 1 be moved through a considerable angle, one of segments 22 or 23 will contact with trolley 25 and motor 20 will be energized to cause member 38 to follow up the movement of disc 21. When the sighting instrument comes to rest, trolley 25 will finally be brought back upon insulating portion 24, whereupon gear 26 and indicator 38 will be positioned within the limits of accuracy of transmitter 12 and repeater 18. It will be understood that in case the position of the commutator discs 21 and 34 relative to the trolleys at any time becomes such as to exert an opposing influence on the field of motor 20, then the current from the coarse disc 21 will predominate owing to the resistance 40 in circuit with the fine trolley and also to the fact that the disc 34, due to its more rapid rotation, will not be able to build up an opposing field in the motor 20 sufficient to overcome the continuously exciting influence of the disc 21. If at this time, trolley 25' is still on a contact portion of disc 34, which has meanwhile been turning in the same direction as shaft 28 and disc 34, the motor will continue to turn shaft 28 and gear 26 until trolley 25' is brought upon insulating portion 24'. At this time gear 26 and indicator 38 are positioned accurately in accordance with the position of sighting instrument 1. It will thus be seen that repeater 18 serves to position the indicator roughly and that repeater 19 supplements repeater 18 and positions the indicator accurately, and that indicator 38 is always self-synchronous with the sending instrument owing to the predominating influence of the coarse control for large angles. It should furthermore be noted that gear 26 may serve to actuate various instruments. For instance, shaft 37 of said gear may be suitably connected with a battle tracer, searchlight, compass alidade, etc.

It will furthermore be seen that, with the above described form of invention, if the current between the transmitters and repeaters should suddenly fail and the instrument 1 be moved, the gear 26 and associated parts will be quickly restored to synchronism with instrument 1 when the current is re-established. When the current comes on repeater 18 will cause motor 20 to position said parts within the limits of accuracy of said repeater and its transmitter, within four or five degrees of the position of instrument 1, for example, and thereupon repeater 19 will cause the parts to be positioned accurately.

Fig. 6 is the preferred arrangement of coarse and fine commutator discs for controlling the reversible power motor. In this figure and also in Fig. 7, the repeater motors have been omitted for the sake of simplicity, but it will be understood that they are employed as shown in Figs. 2 and 4 to drive the commutating discs 21' and 34' respectively. In Fig. 6 the disc 34' may be in all respects the same as 34. Reduction gearing 45 is shown interconnecting the gear members carrying the trolleys 46 and 47. Disc 21', is provided with one comparatively narrow conducting strip 48 (say 5°) and another much larger conducting section 49, while the trolley 47, instead of being connected in parallel with the other trolley as in Fig. 4, is connected through resistance 40 to the strip 48. By this arrangement, therefore, when the repeater system is within 5° of synchronism, current passes through the coarse trolley 46, segment 48 and fine trolley 47, to operate the power motor 20' to synchronize exactly. When, however, the system is more than 5° from synchronism the fine trolley circuit is open while the current passes from the coarse trolley through segment 49 to the motor 20' to bring the mechanism to within 5° of synchronism when the fine trolley again controls it as described above. In this case also the motor 20' is shown as provided with a double opposed armature and a single wound field instead of with a double wound field as in Fig. 4.

In Fig. 7 the coarse commutator 21'' is provided as in Fig. 4 with a broad dead section 24'' and the two live sections 22 and 23, but instead of being connected directly the motor, said live sections are connected respectively to two coils 50 and 51 of relay 52. Said relay operates to open a normally closed contact 53 in circuit with the fine trolley 47'. According to this form of the invention, if the repeater system is within, say 5°, of synchronism, the coarse commutator is out of action so that the relay contact 53 is closed and the system will synchronize exactly. If, on the other hand, the receiver is more than 5° from synchronism, current from the coarse trolley 46 will pass through one of relay coils 50 or 51, thereby opening the circuit of the fine trolley at 53 and also passing on to drive the motor 20' in the proper direction. When the receiver comes to within 5° of synchronism, the circuit of the coarse trolley is broken at 24'' and the fine trolley is again thrown into the circuit with the motor by the closing of switch 53.

In accordance with the provisions of the patent statutes, we have herein described the principle and operation of my invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a self-synchronous receiver, the combination with a repeating device, of a pair of coarse and fine repeater motors, the former of which is adapted to be driven from a coarse transmitter having a one-to-one drive with the sending instrument and the latter to be driven from a fine transmitter having a multiple drive from said instrument, a power motor for driving said device, a contact member having a short arcuate contact and a long arcuate contact, and a cooperating contact member, said members being differentially rotated from said coarse motor and power motor, circuit means for driving the power motor in one direction when contact is made between said cooperating contact and the long contact, a pair of semi-circular reversing contact members, a cooperating contact member, said members being differentially rotated from said fine repeater motor and power motor, and a circuit between said short arcuate contact and said last-named cooperating contact whereby said power motor is driven in either direction under the control of said fine motor when the receiver has been approximately synchronized by the coarse motor.

2. In a self-synchronous receiver, the combination with a repeating device, of a pair of coarse and fine repeater motors, the former of which is adapted to be driven from a coarse transmitter having a one-to-one drive with the sending instrument and the latter to be driven from a fine transmitter having a multiple drive from said instrument, a power motor for driving said device, a contact member having a short arcuate contact and a long arcuate contact, and a cooperating contact member, said members being differentially rotated from said coarse motor and power motor, circuit means for driving the power motor in one direction when contact is made between said cooperating contact and the long contact, a pair of reversing contact members, a cooperating contact member, said members being differentially actuated from said fine repeater motor and power motor, and a circuit between said short arcuate contact and said last-named cooperating contact whereby said power motor is driven in either direction under the control of said fine motor when the receiver has been approximately synchronized by the coarse motor.

In testimony whereof we have affixed our signatures.

ELMER A. SPERRY.
ELMER A. SPERRY, Jr.